Feb. 19, 1952     D. A. MEEKER ET AL     2,585,957
MEAT SAW WITH CLEANING AND SCRAP COLLECTING APPARATUS
Filed Feb. 20, 1946     13 Sheets—Sheet 1
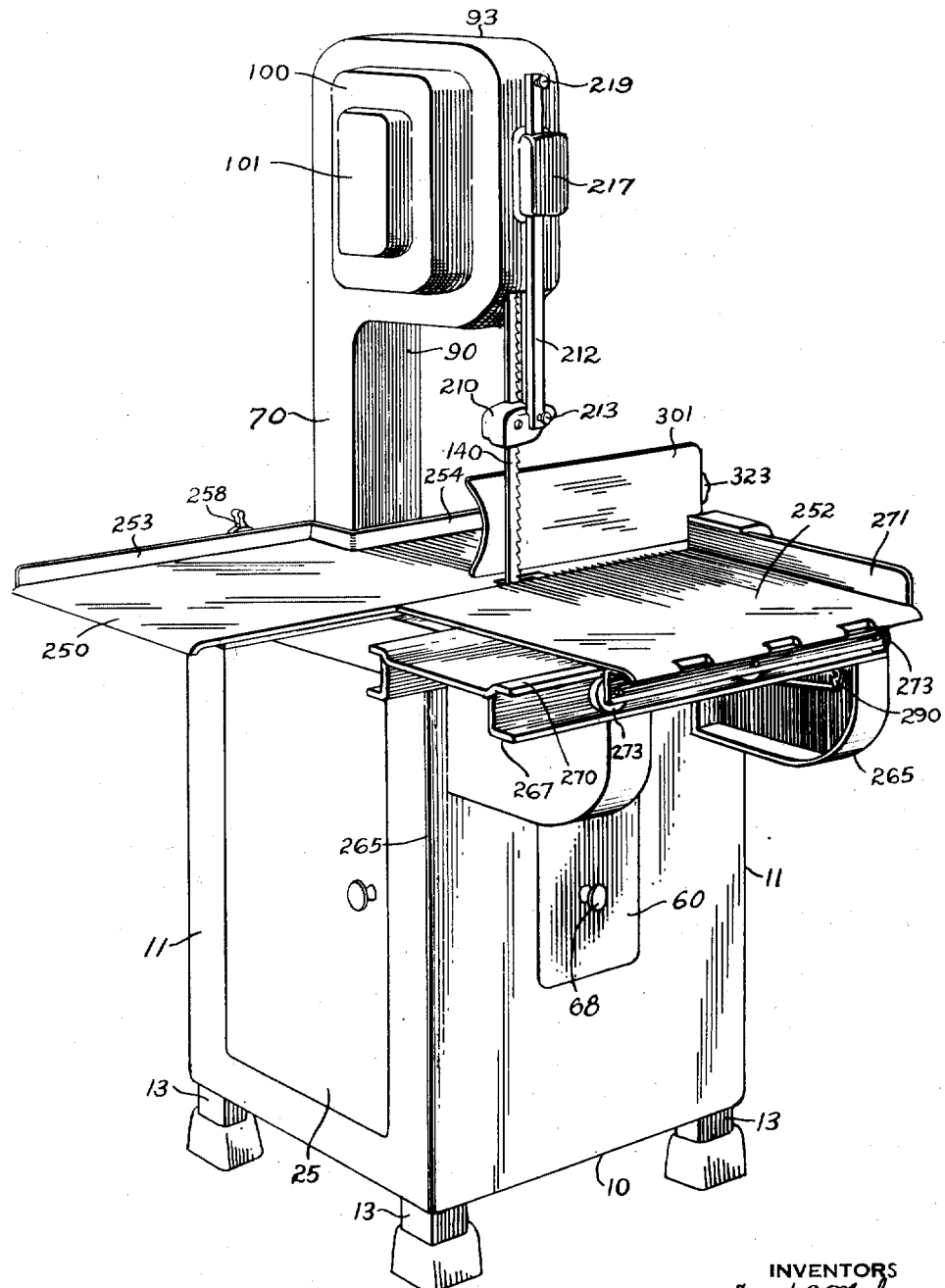

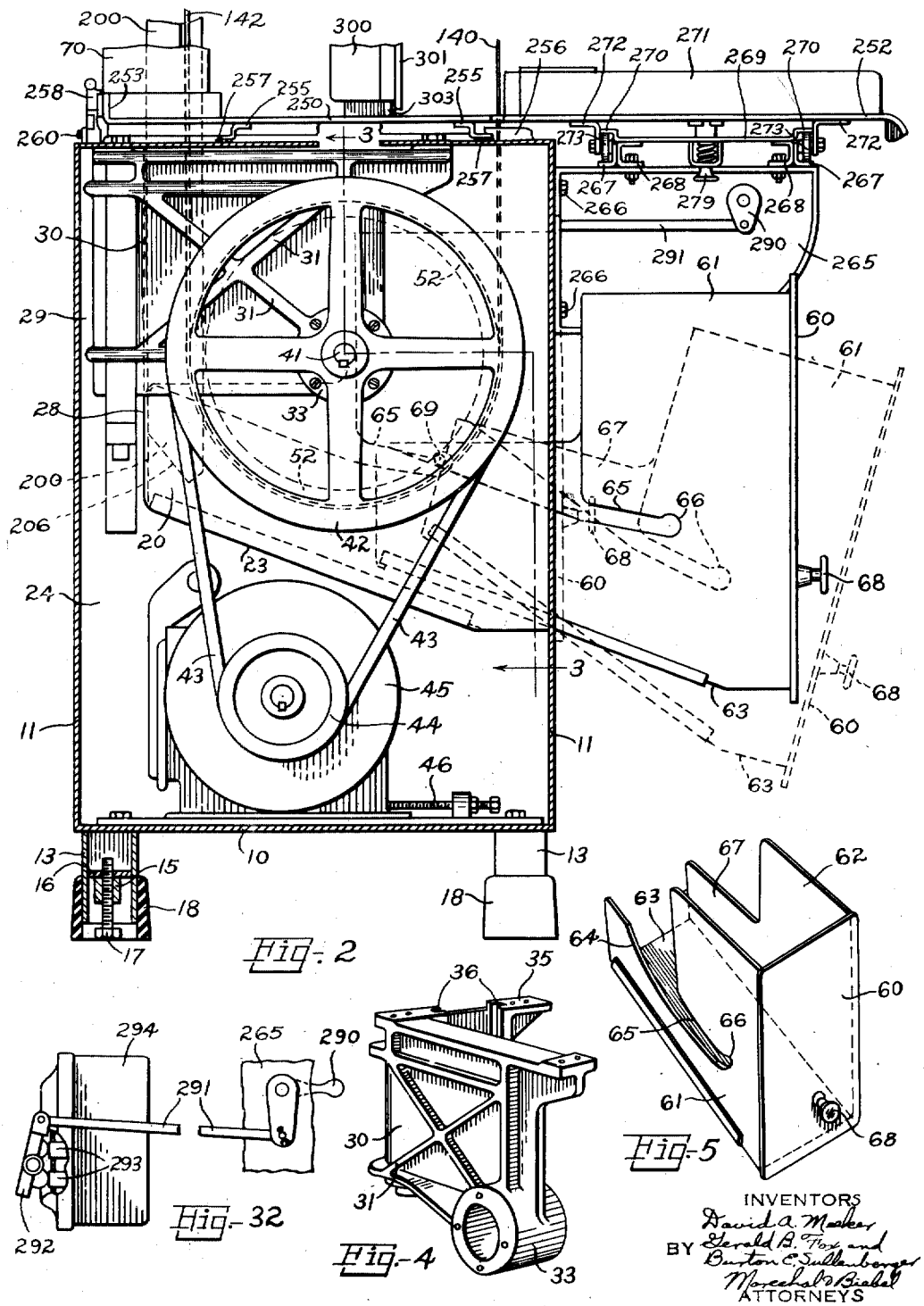

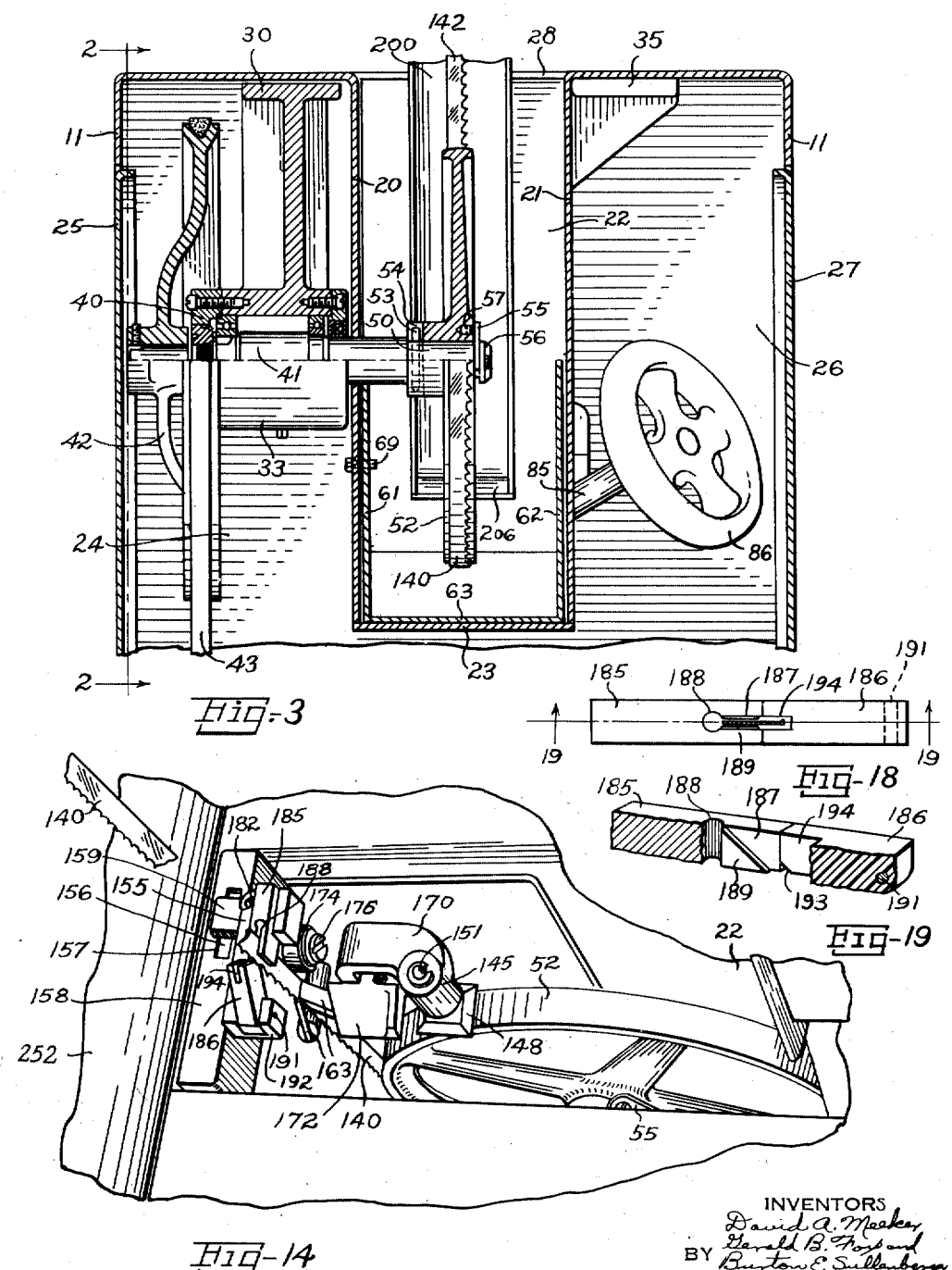

Feb. 19, 1952  D. A. MEEKER ET AL  2,585,957
MEAT SAW WITH CLEANING AND SCRAP COLLECTING APPARATUS
Filed Feb. 20, 1946  13 Sheets-Sheet 4
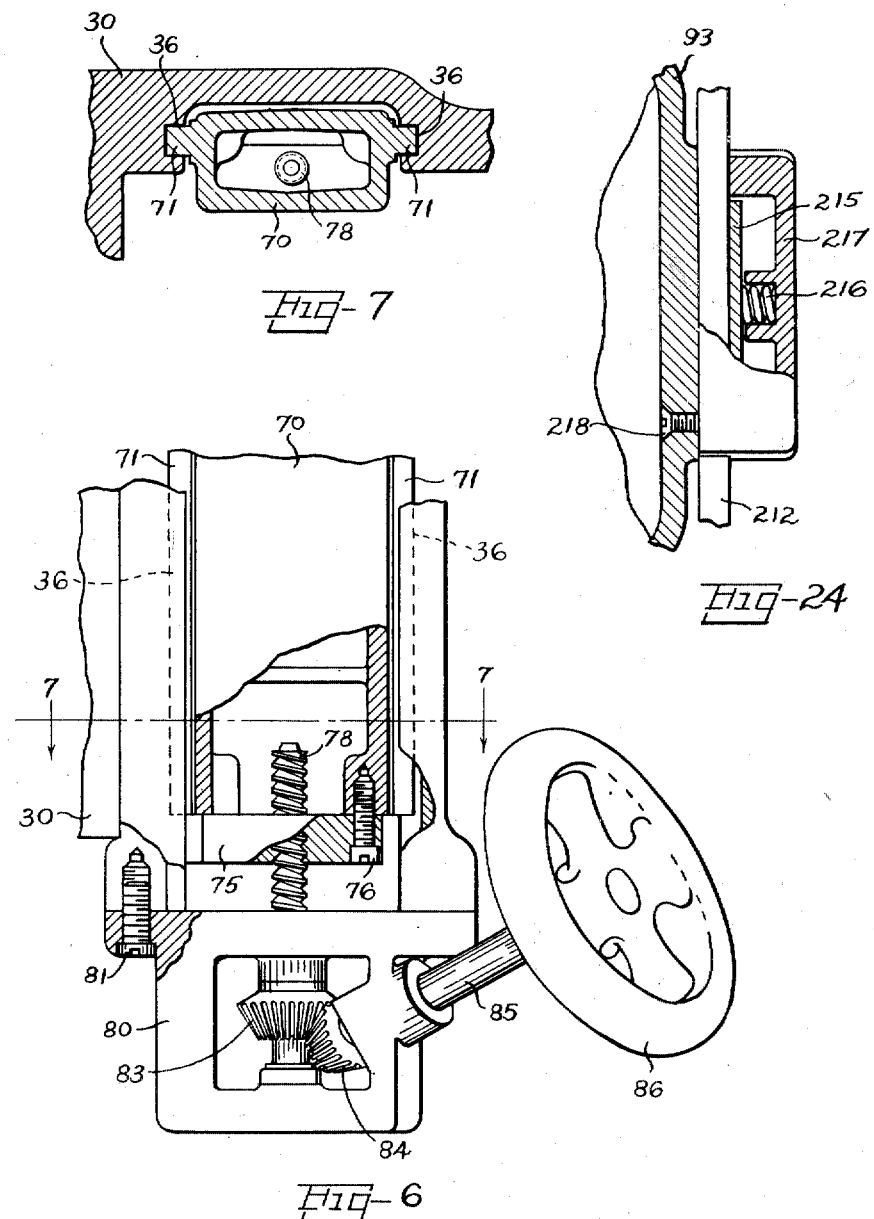

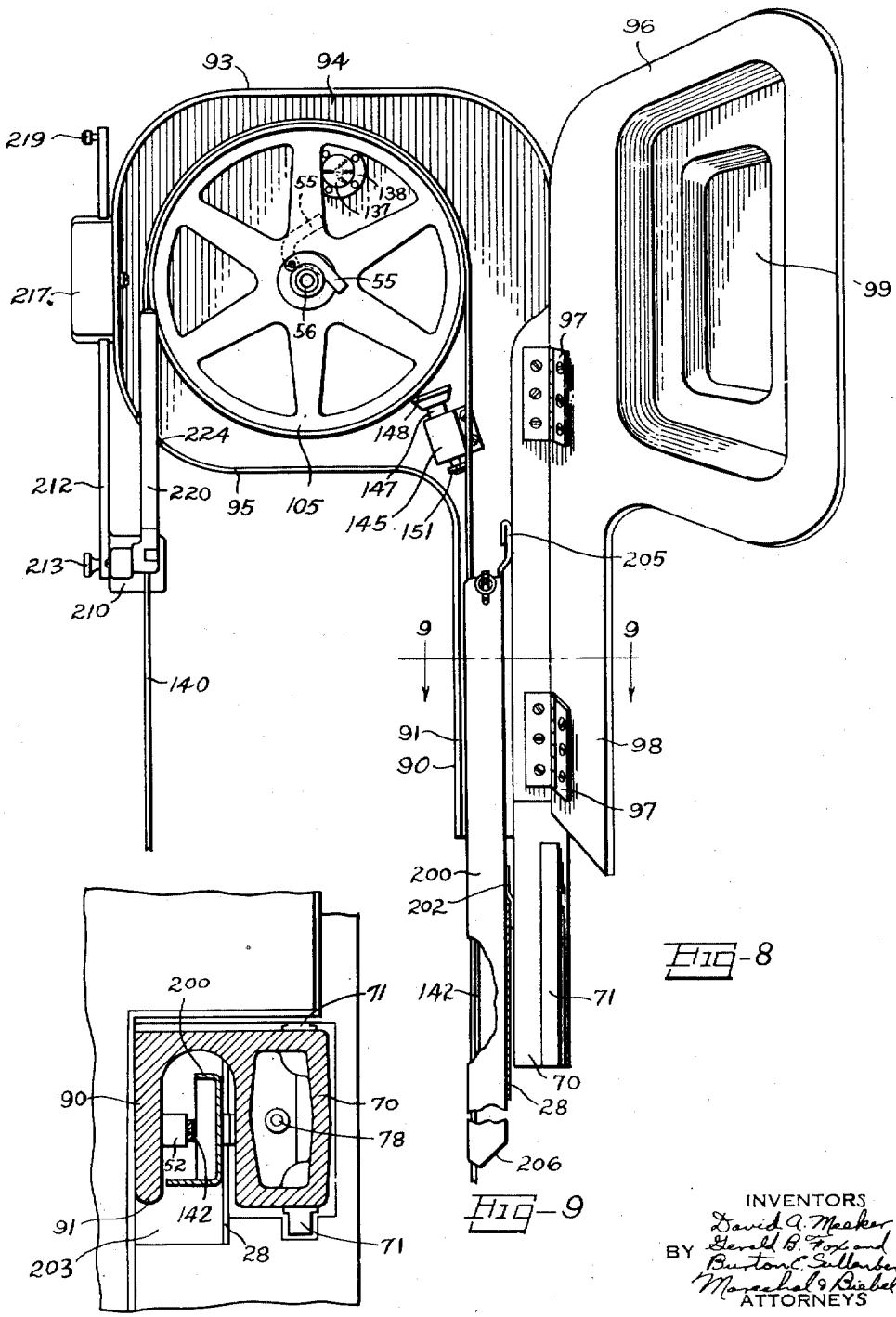

Feb. 19, 1952     D. A. MEEKER ET AL     2,585,957
MEAT SAW WITH CLEANING AND SCRAP COLLECTING APPARATUS
Filed Feb. 20, 1946     13 Sheets-Sheet 6

INVENTORS
David A. Meeker,
Gerald B. Fox and
Burton E. Sullenberger
BY
Marechal & Biebel
ATTORNEYS

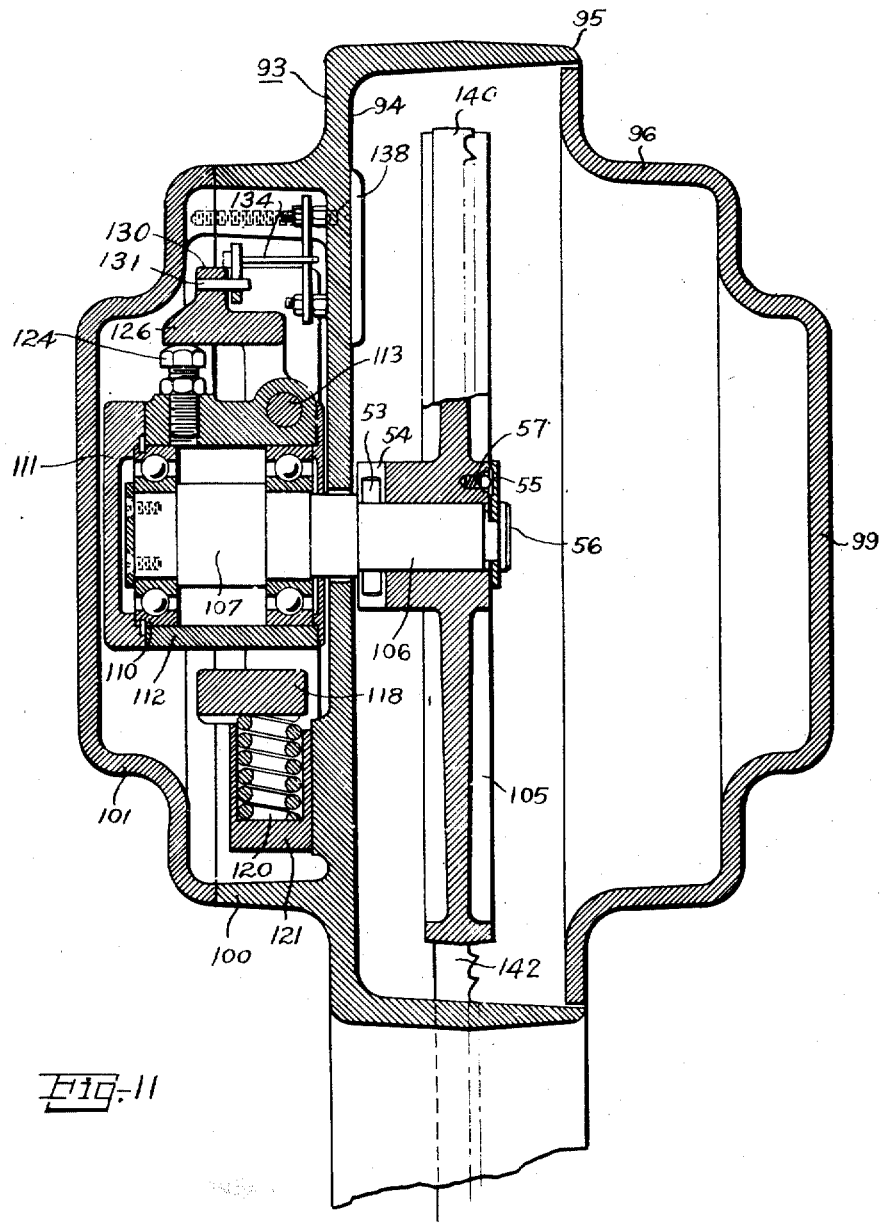

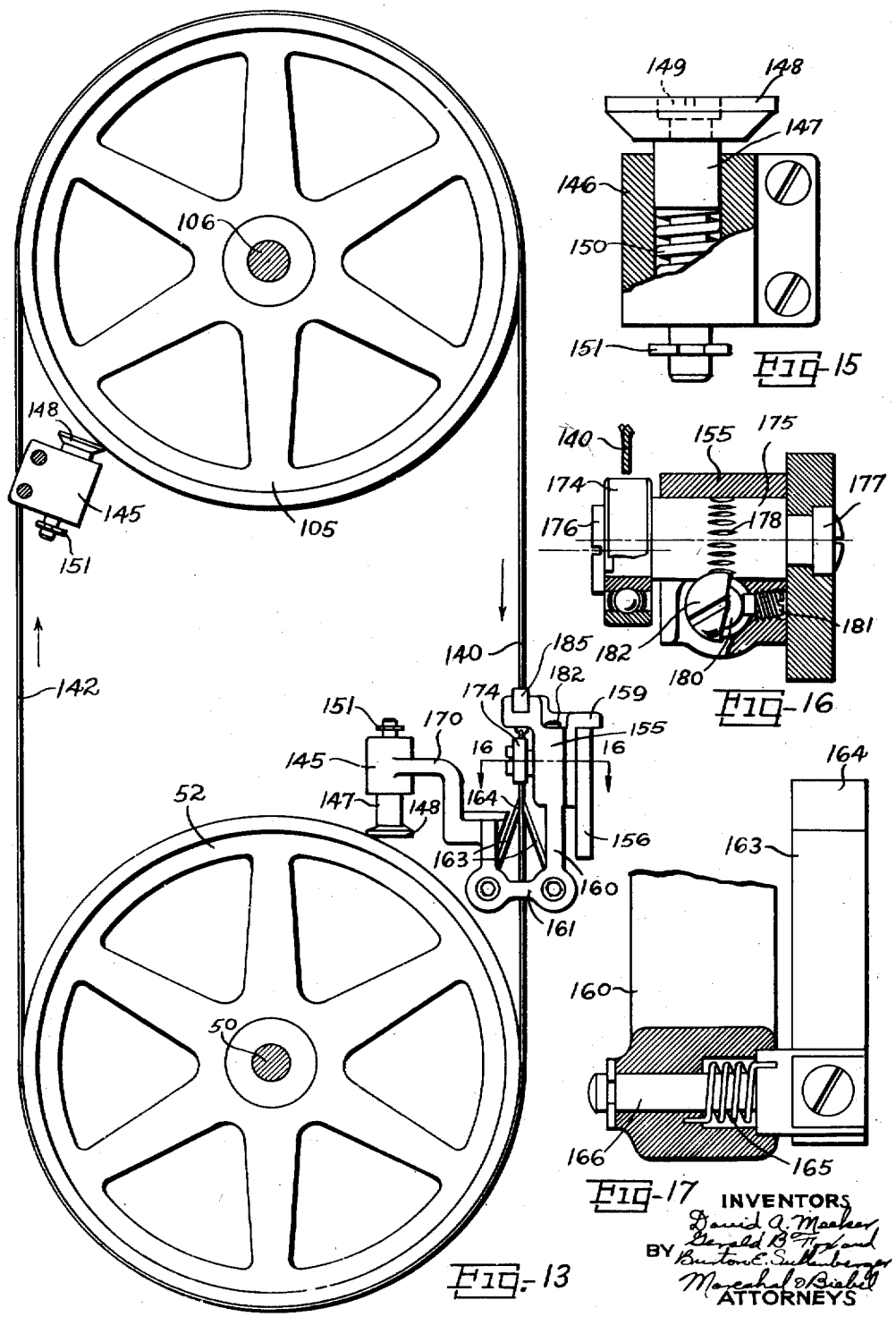

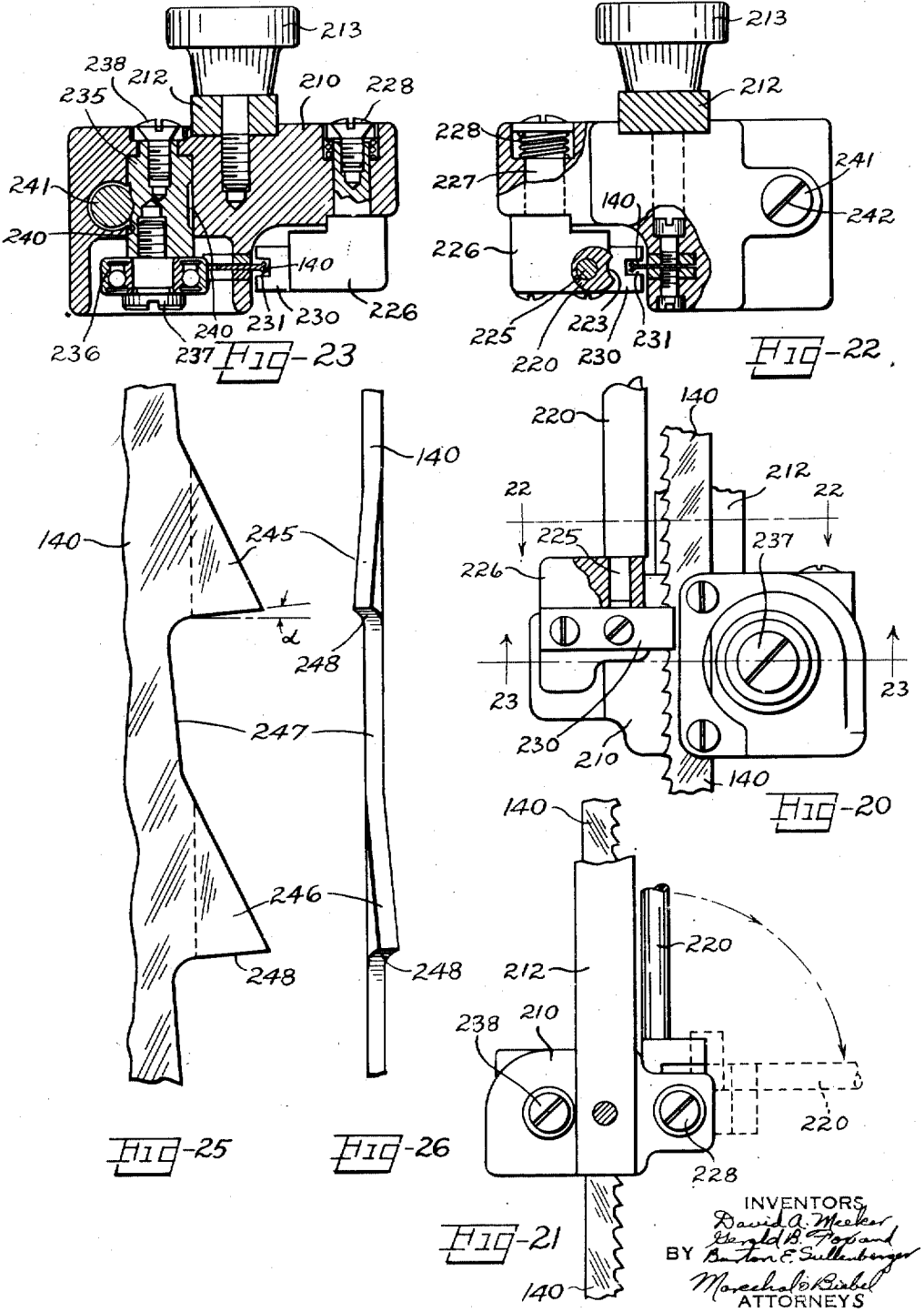

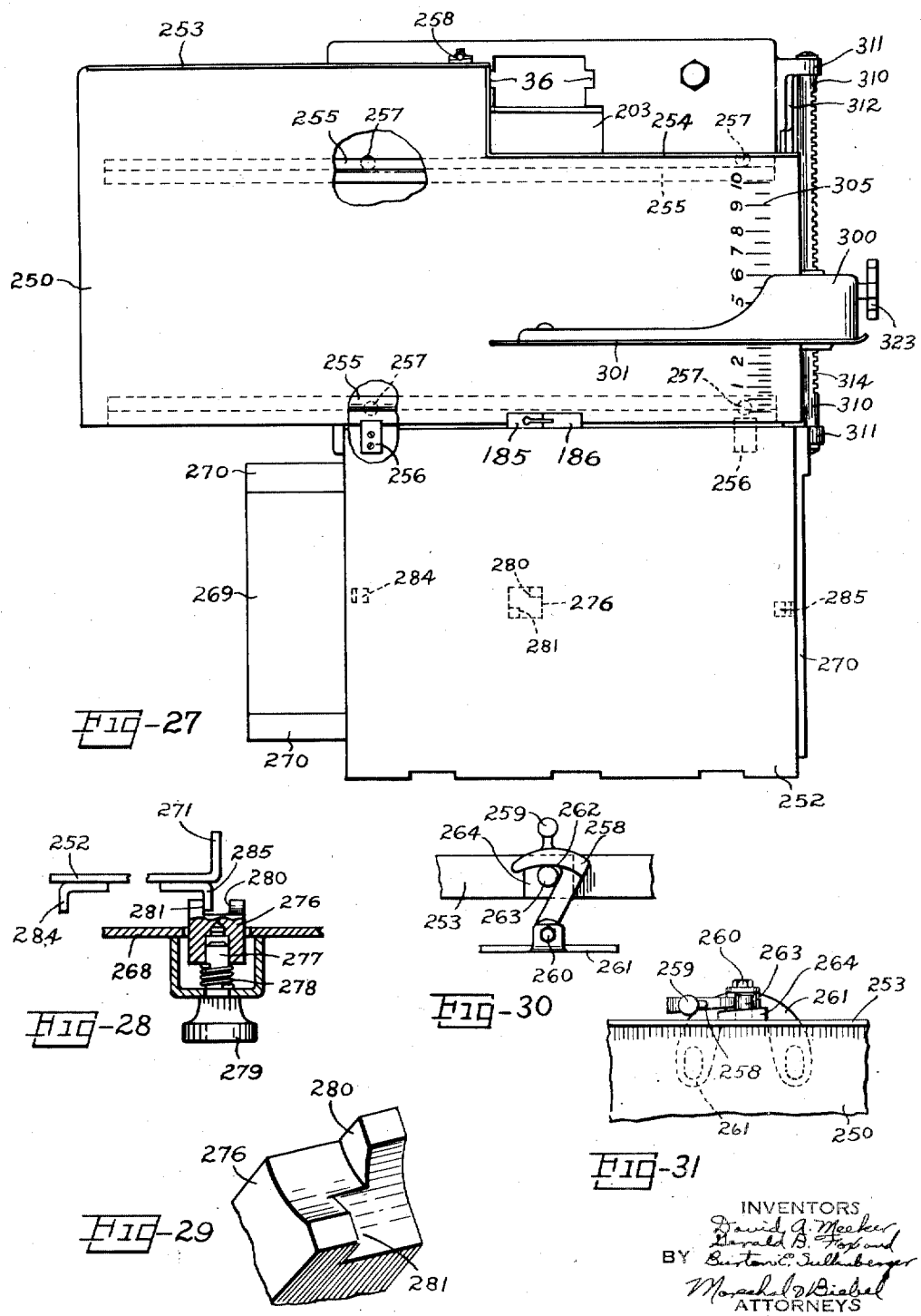

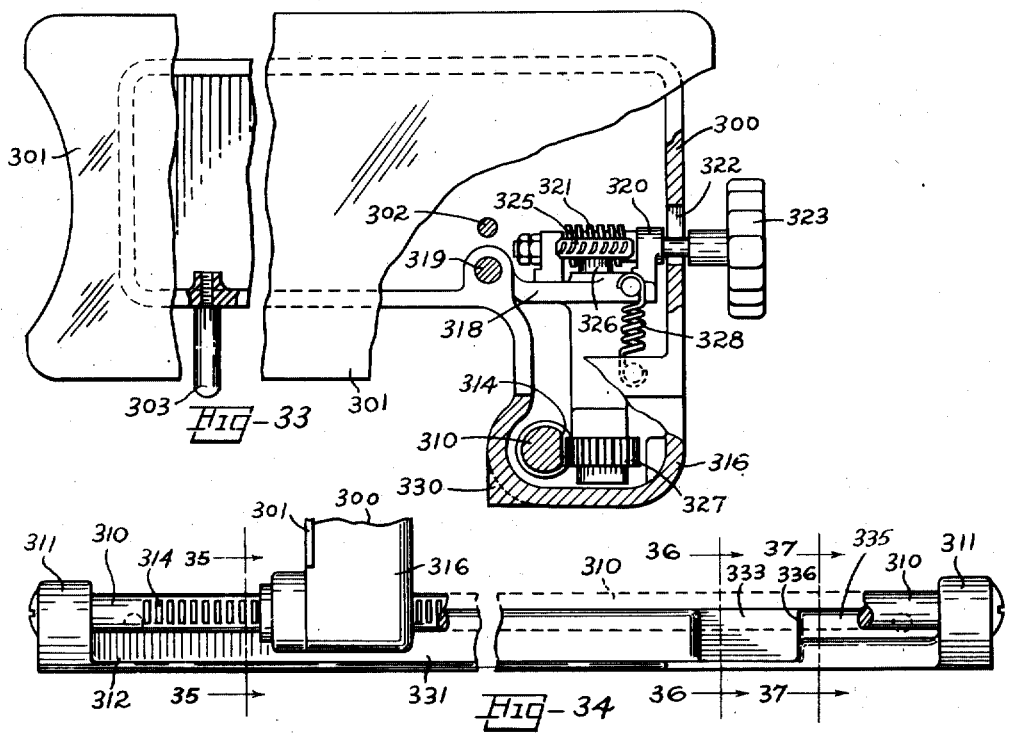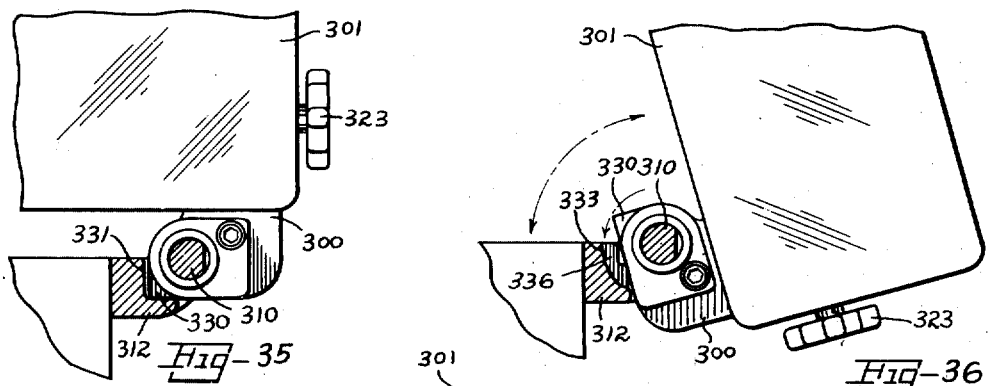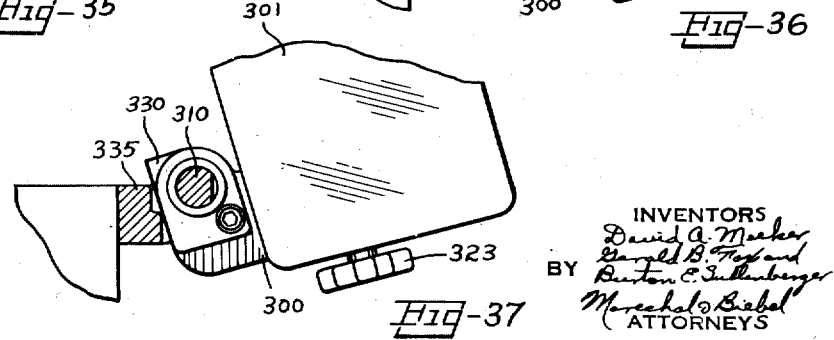

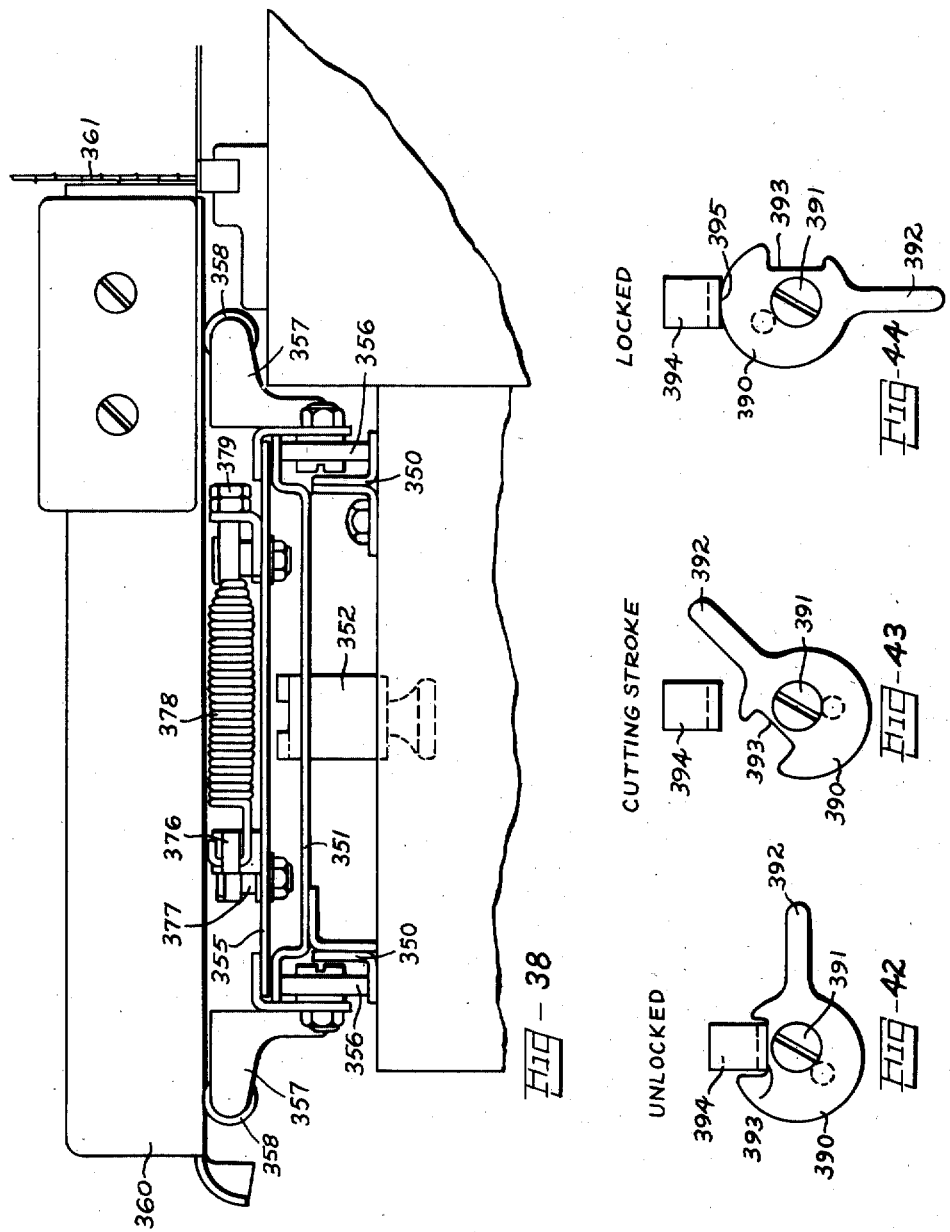

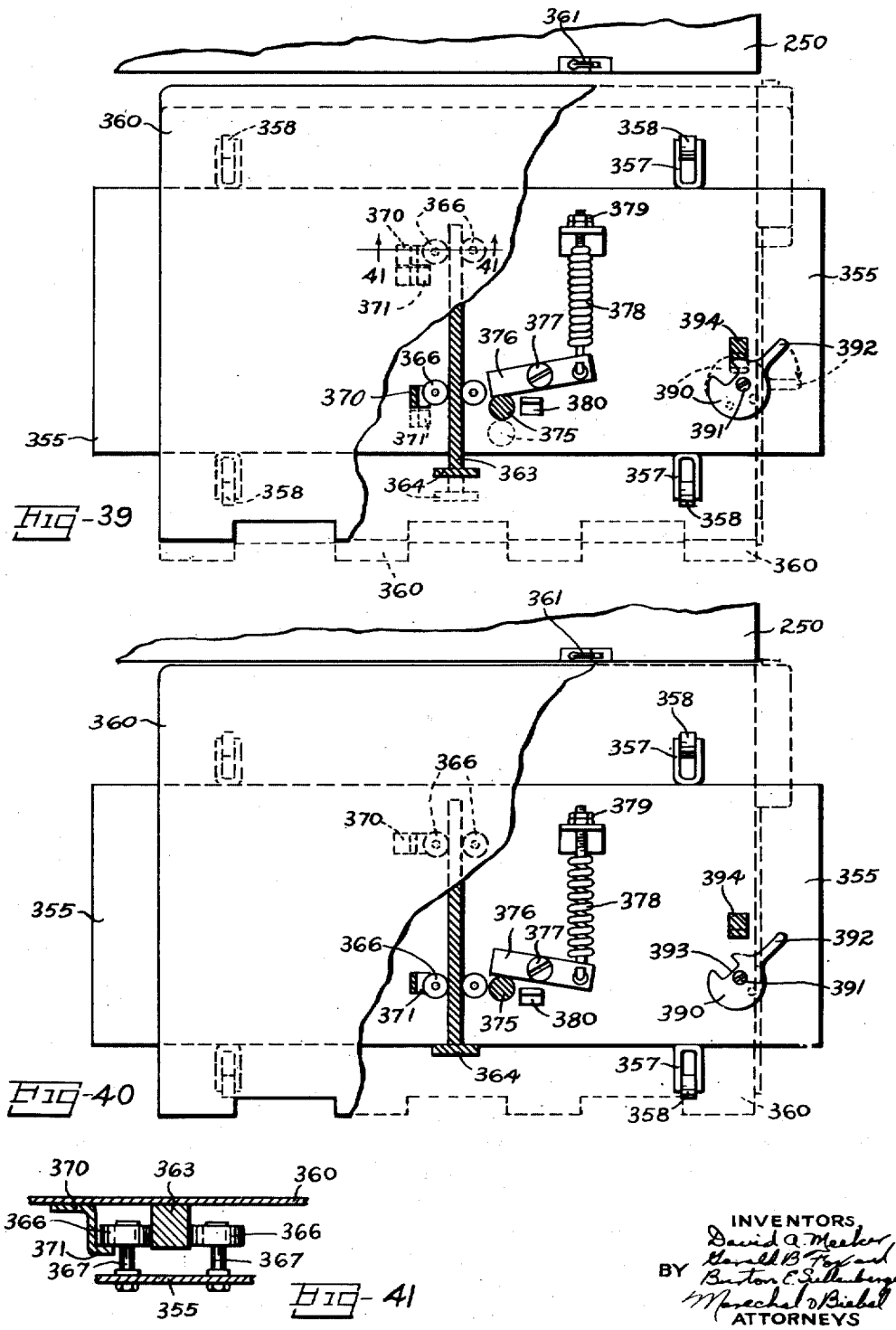

Patented Feb. 19, 1952

2,585,957

UNITED STATES PATENT OFFICE 2,585,957

MEAT SAW WITH CLEANING AND SCRAP COLLECTING APPARATUS

David A. Meeker, Gerald B. Fox, and Burton E. Sullenberger, Troy, Ohio, assignors to The Hobart Manufacturing Company, Troy, Ohio, a corporation of Ohio Application February 20, 1946, Serial No. 648,898

10 Claims. (Cl. 143—157)

This invention relates to saws and more particularly to band saws for the cutting of food products.

It is the principal object of the invention to provide a band saw for the handling of meat, fish, fowl, bone, and other food products, which is simple in operation, can be readily shipped and assembled, which affords a high degree of safety for the operator, and which is so constructed as greatly to facilitate the cleaning of the machine making it easy to keep the same in a clean and sanitary condition.

It is a further object to provide such a saw in which the major part of the operating mechanism is located in a protected position away from the saw and the scraps and waste particles which are formed during the cutting operation so that such scraps will not collect upon the mechanism and require cleaning.

It is also an object to provide a saw having collecting devices for the scraps which devices are removable for ready cleaning, the construction being such that the entire surface of the machine exposed to the scraps and the like, even in the absence of such devices, may be easily kept in a clean and sanitary condition.

Another object is to construct and arrange those parts of the mechanism on which scraps and food particles are most likely to be deposited in use in such manner that they can be quickly and easily removed and replaced, or access thereto provided, without the use of special tools to thus facilitate the cleaning of the machine.

It is also an object to provide a construction in which the tension on the saw is at all times readily adjustable without requiring access to the rear of the machine so that it can be installed close to a wall, and in which an indication of the tension in the blade is provided for the information of the operator.

It is also an object to provide a saw of this character in which the saw blade is properly cleaned and protected so that it normally runs true affording an accurate cut, while at the same time being properly protected in case it should leave its normal path of travel.

It is likewise an object to provide devices for guiding and cleaning the saw blade which may be readily adjusted in place and easily removed for cleaning and the like.

It is a further object to provide an improved construction of work table, carriage, and gage plate, affording accurate and rapid selection of the slice thickness and enabling the full width of the cutting table to be used if desired.

It is a further object to provide a construction in which the work material is shifted away from the saw on the return stroke to reduce rubbing contact with the back and side of the saw blade, the proper cutting position being established for the next forward or cutting stroke.

Other objects and advantages will be apparent from the following description, the accompanying drawings, and the appended claims.

In the drawings:

Fig. 1 is a view in perspective of a meat saw constructed in accordance with the present invention;

Fig. 2 is a view in vertical section from one side of the housing of the base of the machine substantially on the line 2—2 of Fig. 3 and showing the scrap collecting drawer in different positions;

Fig. 3 is a broken sectional view through the base of the machine on the line 3—3 of Fig. 2;

Fig. 4 is a perspective view of the main supporting frame in the base of the machine;

Fig. 5 is a perspective view of the scrap collecting drawer;

Fig. 6 is an elevational view with parts broken away showing the construction of the adjusting mechanism for elevating the head;

Fig. 7 is a horizontal sectional view on the line 7—7 of Fig. 6 through such elevating mechanism;

Fig. 8 is a view in side elevation of the head of the device with the closure shown in open position illustrating the upper band wheel and related mechanism;

Fig. 9 is a horizontal sectional view on the line 9—9 of Fig. 8 through the pedestal or column of the head;

Fig. 11 is a broken sectional view on the line 11—11 of Fig. 10;

Fig. 13 is an elevational view of the upper and lower band wheels, the wheel scrapers and the lower band guide and supporting mechanism;

Fig. 14 (sheet 3) is a view in perspective showing the unitary construction of the support for the lower wheel scraper, band guide and supporting structure in place in the machine;

Fig. 15 is a detail view partly in section of one of the wheel scrapers;

Fig. 16 is a sectional view partly in plan of the eccentric mounting of the thrust bearing for the rear edge of the blade, substantially on the line 16—16 of Fig. 13;

Fig. 17 is a detail view of the support for one of the blade wipers;

Fig. 18 (sheet 3) is a plan view of the lower blade guide;

Fig. 19 is a vertical sectional view on the line 19—19 of Fig. 18;

Fig. 20 (sheet 9) is a side elevational view with parts broken away of the upper guide and guard assembly for the blade;

Fig. 21 is an elevational view of the same from the opposite side;

Fig. 22 is a view partially in horizontal section and partially in elevation substantially on the line 22—22 of Fig. 20;

Fig. 23 is a horizontal section of the same assembly looking upwardly from below on the line 23—23 of Fig. 20;

Fig. 24 (sheet 4) is a view partially in side elevation and partially in section showing the friction support for the upper guide and guard assembly;

Figs. 25 and 26 (sheet 9) are side and elevational views respectively of the teeth of the band saw on an enlarged scale;

Fig. 27 is a plan view of the working top of the machine with the upper head removed;

Fig. 28 is a detail view through the latch for removably securing the work carriage in position;

Fig. 29 is a perspective view of the upper end of the latch member for the carriage;

Fig. 30 is a rear elevational view on an enlarged scale showing the locking mechanism for the work table top;

Fig. 31 is a top plan view of the mechanism shown in Fig. 30;

Fig. 32 (sheet 2) is a broken side elevational view of the control for actuating the switch of the drive motor;

Fig. 33 (sheet 11) is a view in side elevation with certain parts broken away showing the gage plate and its adjusting mechanism;

Fig. 34 is a broken side elevational view of the gage plate adjusting and interlocking mechanism;

Fig. 35 is a vertical sectional view of the line 35—35 of Fig. 34 showing the gage plate in its normal operative position;

Fig. 36 is a vertical sectional view on the line 36—36 of Fig. 34 showing the gage plate in the position where it is free to swing from an operative to an inoperative position;

Fig. 37 is a vertical sectional view on the line 37—37 of Fig. 34 showing the gage plate in its most rearward position where it is locked in raised position;

Fig. 38 is a side elevational view of a modified form of work supporting carriage;

Figs. 39 and 40 are broken top plan views showing the work carriage of Fig. 38 in different operative relations with respect to the blade;

Fig. 41 is a detail vertical sectional view on the line 41—41 of Fig. 39; and

Figs. 42, 43 and 44 (sheet 12) are schematic views showing the position of the latching members in the unlocked, the normal operative position where the carriage can be moved laterally, and the locked position of the carriage, respectively.

Figure 10:
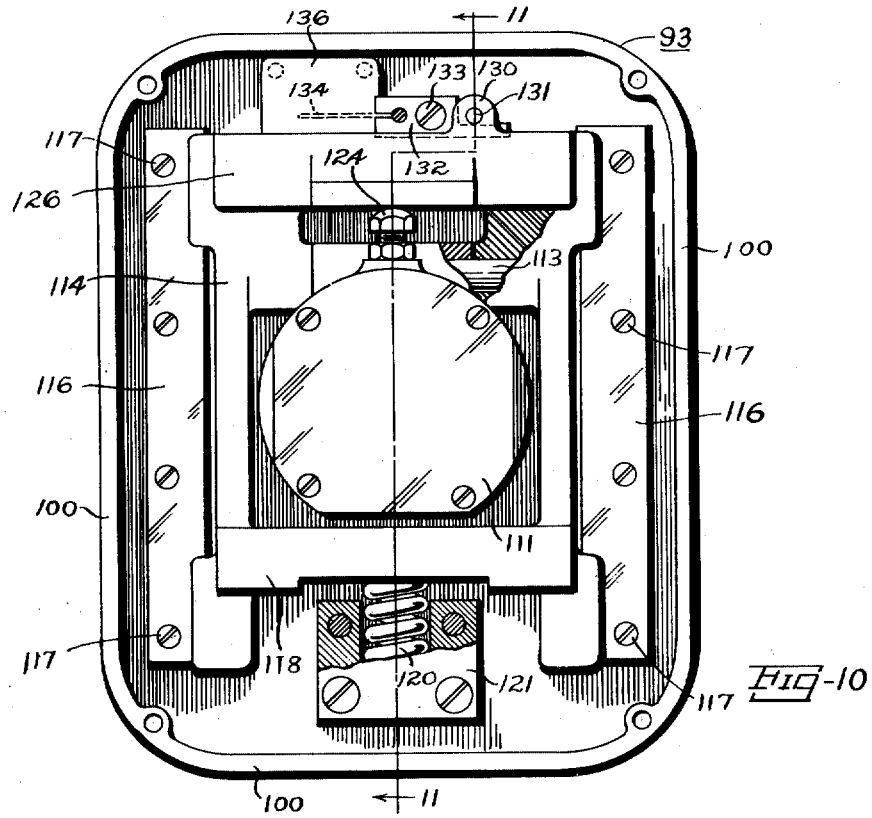
Fig. 10 is a side elevational view of the head with the outer cover removed showing the mechanism for supporting the upper wheel bearing and the blade tension indicator mechanism.

Referring to the drawings which illustrate a preferred embodiment of the invention, Fig. 1 is a view in perspective of a meat saw constructed in accordance with the present invention. As there shown the machine comprises a bottom wall 10 on which are mounted generally rectangular sides 11 which as shown in Fig. 1 form an enclosing casing completely concealing the mechanism within the base. A series of legs 13 are welded to the under side of the bottom wall 10 and provision is made for adjusting the height of each leg to level the machine regardless of the unevenness of the floor on which it rests. For this purpose each leg carries a threaded nut 15 (Fig. 2) on a central plate 16, a bolt 17 being threaded into the nut and adjustable to engage the floor at a selected elevation. Such bolts are also conveniently used to bolt the legs to the container in which the machine is shipped.

It is important to prevent access of dirt and foreign matter beneath the legs of the machine, and for this purpose flexible sleeves 18 of neoprene or other suitable rubber-like material are provided. These sleeves slip over and have frictional engagement with the tubular legs 13. The sleeves are pushed up while the bolts 17 are being adjusted to level the machine, and thereafter are drawn downwardly against the floor thus sealing the legs and preventing access of foreign matter thereto, the base of the machine being supported in raised position above the floor to allow cleaning of the space therebeneath.

A pair of partition walls 20, 21 extend through the machine above the bottom wall thereof defining between them a substantially centrally located compartment 22 which is adapted to receive the lower band wheel as shown in Fig. 3. The lower side of the compartment is formed by a partition wall 23 which is secured permanently to side walls 20, 21 and as shown in Fig. 2 slopes upwardly toward the rear of the machine, leaving a space above bottom wall 10. A closed space 24 is thus formed at one side of partition 20 access to which is afforded by side closure member 25 pivoted to the side wall 11 of the housing.

Similarly a closed space 26 is formed at the side of partition 21, a closure 27 being provided on the opposite side 11 of the housing to afford similar access to this space. The two spaces 24 and 26 are thus separated from each other by reason of their location on opposite sides of the closed central compartment 22 but open into the common space below the lower wall 23 thereof, and also rearwardly of the back wall 28, reference numeral 29 indicating such rearward space.

It is desirable in a machine of this character to provide a proper structural support for the operative parts of the mechanism, and to insure that the upper and lower band wheels will be located and maintained in proper alignment and working relation with each other. For this purpose a frame member indicated generally at 30 in Fig. 4 is provided. Such frame member is bolted to the top of the base housing and is suitably ribbed as shown at 31 to provide increased strength. One side of the frame projects forward in space 24 and the frame is formed with boss 33 which serves as a support for the bearing for the lower band wheel. The frame member has an integral part 35 extending across the rear of the central compartment 22 within space 29, and this portion is formed with guideways 36 (Figs. 6 and 7) for receiving the slide portion of the upper head.

Referring now to Figs. 2 and 3, the boss 33 of the frame 30 is shown as supporting the antifriction bearing 40 in which the shaft 41 is journaled. This shaft carries a drive pulley 42 over which there travels the V belt 43 which has driving engagement with the pulley 44 on the shaft of the drive motor 45, the latter being adjustably positioned on the bottom wall 10 of the housing in the space below the center compartment. Adjusting means 46 are provided for moving the motor across the bottom wall to tighten the belt as required, access for this purpose being provided through closure 25.

Shaft 41 extends through an opening in partition 20 and has an overhanging end with a portion of reduced diameter 50 located within the central compartment 22. This shaft provides a support for lower band wheel 52 which as shown is received over the reduced shaft portion and held in fixed operative position against the shoulder. The drive is effected through cross pin 53 which is engaged with a slot 54 on the end of the hub when the wheel is assembled on the shaft allowing direct withdrawal thereof. The face of the wheel is preferably crowned to provide proper retention of the blade thereon in use.

The upper and lower band wheels are interchangeable and the attachment therefor is the same, and provides for rapid removal thereof without requiring the use of tools, when it is desired to remove the wheels for cleaning or other purposes. For this purpose a latch member 55 (Figs. 3 and 9) is pivotally mounted on the hub of the wheel and is adapted to be moved to a locking position where it engages beneath the head of a stud 56 formed by grooving the shaft rearwardly of the head. A spring detent 57 is provided for retaining the latch in its operative position while the wheel is in use. In order to remove the wheel, however, it is only necessary to free the latch from the detent and swing it out to a clearance position from beneath the head 56, whereupon the wheel can be directly withdrawn from the shaft. This greatly facilitates the disassembly and reassembly of the wheel in the cleaning operation.

The two spaced side walls 20 and 21 and bottom wall 23 of the central compartment 22 are relatively smooth and free of projections on which scraps and foreign matter can collect and from which it would be difficult to effect their removal, and the entire interior wall surface of the compartment is thus capable of being cleaned readily by a simple wiping with a clean cloth. In order to facilitate the collection and removal of scraps of the work material, a drawer 60 is provided which is received through an opening in the front of the housing 11, the drawer having substantially the construction as shown in Fig. 5. As there shown it comprises side walls 61 and 62, and a bottom wall 63 which tapers upwardly as shown more in detail in Fig. 2 conforming to wall 23 of the compartment 22, but there is no wall at the inner end. Side wall 61 is cut away as shown at 64 and is provided with an extended slot 65 having an upwardly curved end 66. The opposite side 62 also has an offset portion but the inner part 67 of the wall remains at a higher level than the wall 61. The drawer carries a handle 68 by means of which it can be withdrawn from the compartment.

The drawer is of substantially the proper width to be received between spaced partitions 20 and 21 and when assembled in operative position, the innermost dotted line position shown in Fig. 2, it substantially underlies the entire projection of lower band wheel 52 and thus is in position to pick up and collect the scraps which fall therefrom, with the front wall of the drawer forming the closure for the access opening in the front of the housing to the compartment 22. It will also be noted that the front wall and adjacent portions of the side walls of the drawer are relatively high and cooperate to enclose the forward portion of the lower band wheel 52 to receive material thrown off by centrifugal force from the wheel and the downward flight of the saw band as it passes around the wheel.

In order to prevent the possibility of the end of the drawer coming into contact with the band wheel and band saw if an attempt should be made to insert the drawer while it is tilted downwardly, as indicated in the outermost dotted line position of Fig. 2, a pin 69 is fixed to the side of partition 20 in such relation that the end of the side wall 61 of the drawer will abut pin 69 before the drawer has been inserted far enough to come in contact with the wheel, and thus prevent further inward movement. If the drawer is tilted up to its proper position, indicated in full lines in Fig. 2, the side wall 61 of the drawer will then pass below stop pin 69 and the drawer can then be inserted to its innermost position where the curved end 66 of the slot will be received over stop pin 69 to serve as a latch for retaining the drawer in place. It is only necessary to give the drawer a slight upward lift to free it from the pin following which it can be withdrawn when desired for emptying and cleaning.

In order to provide for the adjustable mounting of the head of the machine upon the base, a hollow pedestal 70 is provided which has gibs 71 (Figs. 6 and 7) which are adapted to be slidably received within guideways 36 in frame member 30. It will thus be evident that the support for the head is provided by the reinforced frame member 30, the same element which provides the bearing support for the lower band wheel, and in this way a solid and reliable relationship is established making it possible to maintain the two band wheels in accurate working relation to each other.

In order to effect vertical adjustment of the pedestal and through that of the head, a bar 75 is bolted to the lower end of the pedestal 70 by means of bolts 76 and is provided with a central screw threaded aperture. A lead screw 78 is threadedly received within the aperture and rotataby mounted in a bracket 80 which is secured by means of bolts 81 to the lower side of frame 30 (Figs. 6 and 7). Screws 78 carries a beveled gear 83 which meshes with a beveled pinion 84 carried by an angularly mounted shaft 85 on which there is received a hand operating wheel 86.

By reason of the angular support of shaft 85, the major portion of that shaft and all of hand wheel 86 are located entirely within the right hand space 26, where this mechanism is completely enclosed and protected against access of food particles from the central chamber 22. Adjustment of hand wheel 86 may be readily effected upon opening the door 27 providing access thereto. It will thus be apparent that substantially the entire mechanism for supporting and driving the lower band wheel, as well as the mechanism for adjusting the height of the pedestal and tensioning the band saw, is located in protected relation in closed spaces at one side or the other of the separate closed compartment in which the band wheel operates. Thus the working parts are protected against access of food scraps and other particles and do not require the frequent and difficult cleaning operation which would otherwise be involved. Similarly, the central compartment is protected against access of lubricant and the like from the working mechanism positioned within the side housings, and a highly sanitary and readily cleanable construction is thus afforded. This construction also provides direct and positive connections for effecting both raising and lowering movement of the head relative to the base, assuring that the head can be directly lowered under all conditions, and because the adjusting mechanism is within the base and accessible through the side of the housing, the machine may be installed and kept close to a wall.

It will also be seen that the pedestal and head are separable from the base when raised to its upper end and the two parts may thus be shipped and handled separately, facilitating such operations and reducing the space required and the weight necessary to be handled.

The pedestal 70 extends upwardly and above the level of the base and is provided with an integral channel structure 90 which as shown in Fig. 9 is open on one side, terminating in flange 91. At its upper part the pedestal is formed, preferably integrally, with an overhanging head 93 which has the main portion thereof recessed providing a smooth flat surface 94 enclosed by a marginal flange or rib 95 which runs into and forms a continuation of the flange portion 91 of the pedestal. It will thus be seen that a mounting is provided for the upper band wheel and for receiving the band saw itself, the latter being protected throughout by the continuous flanges 81 and 95.

In order to protect and provide access to the interior of the head and to the upper band wheel a closure 96 is provided which is hingedly mounted as shown at 97 to the head, with a depending part 98 overlying and substantially enclosing the pedestal itself. The cover may be pressed to form an offset 99 matching the appearance of the other side of the head. It will thus be seen that when cover 96 is in closed position the entire upper head is enclosed and fully protected, while upon being opened, access is immediately provided to the interior of the upper head itself.

The bearing support for the upper band wheel is also located in a separate housing where it is protected from contact with the scraps and food particles carried around by the saw, the head 93 being formed with an outwardly extending annular flange 100 on its side for that purpose as shown in Fig. 11. A cover 101 is bolted in place over the flange to normally close the housing but providing access to the mechanism when desired.

As shown in Figs. 10 and 11 the upper band wheel 105 is supported in the head 93 on the overhanging end 106 of a shaft 107. The shaft 106 has a head 56 at its outer end and a latch 55, pivoted on the hub of the wheel, is adapted to be received beneath the head 56 to latch the wheel in position, a detent 57 being provided to hold the latch, all as described above in connection with the lower band wheel. Shaft 106 has a pin 53 thereon which engages slot 54 on the hub making it possible to pull the wheel directly off the shaft when latch 55 is released, to thus facilitate the removal of the wheel for cleaning without requiring the use of tools.

An anti-friction bearing 110 rotatably supports shaft 107, access to the bearing being provided by removable cover 111. The bearing is mounted in a support 112 which is pivotally carried on a shaft 113 the ends of which are fixed in a slide frame 114. The frame 114 is guided for vertical sliding movement between stationary guide members 116 which are bolted to the inner wall of the housing by means of bolts 117. The movable frame 114 has a lower cross bar 118 which has engagement with a compression spring 120 received within a cup 121 which is secured to the outside of wall 94 of the head.

In order to provide for adjustment of the vertical plane of rotation of the wheel 105, an adjustable stud 124 is threaded into the bearing support 112 and adapted to engage beneath an upper cross bar 126 formed as part of the slide frame 114, the setting of stud 124 varying the pivotal position of the bearing and its support about shaft 113 relative to the slide and the entire head.

When a band saw such as that shown at 140—142 is placed in operative position over the upper and lower band wheels, it is necessary to stretch the band in order to develop the desired degree of tension therein. This is accomplished by the rotation of hand wheel 86, which effects the lifting of the pedestal 70 and the head 93 in relation to the base of the machine in which the lower band wheel is fixedly mounted. The head 93 moves upwardly as an integral part of the pedestal movement, but the upper band wheel 105 is restrained from a corresponding movement because of the presence of the band saw 140—142 in which a tension is developed. As head 93 moves upwardly it transmits its movement directly to cup 121 and through the medium of the resilient spring 120 to the lower bar 118 of slide 114. The wheel, bearing support 112 and slide 114 remain relatively fixed because of the presence of the band wheel, and a tension is thus established in the band saw which is in direct proportion to the extent of compression of spring 120.

It will also be evident that by changing the position of stud 124, the bearing support 112 and as a result the entire bearing 110, shaft 107, and band wheel 105 will be rocked about the axis of shaft 113, thus definitely fixing and establishing the plane of rotation of the upper band wheel.

Figure 12:
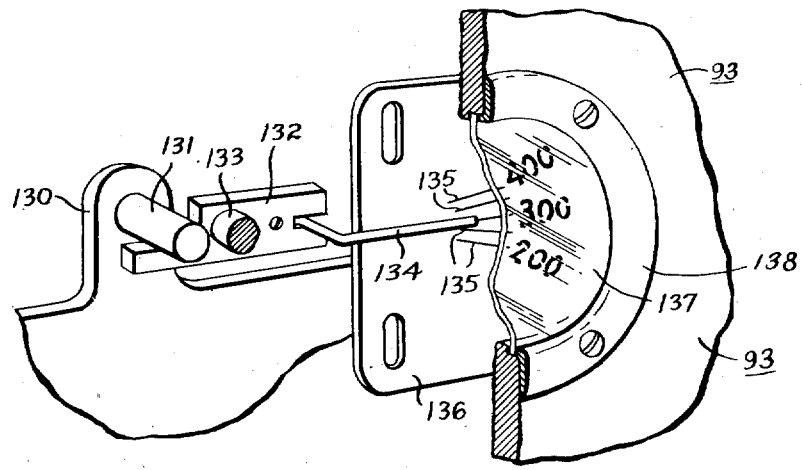
Fig. 12 is a view in perspective on an enlarged scale showing the mechanism for indicating the blade tension.

It is desirable likewise to provide an indication of the actual tension existing in the band saw, so that the operator, having determined the most advantageous tension, can remove and replace a saw and be assured of reestablishing the same tension condition. For this purpose a projecting tongue 130 is provided on the upper side of cross bar 126, such tongue carrying a pin 131 as shown in Fig. 12. Pin 131 bears against one arm of a lever 132 pivotally mounted on pin 133, the other end of the lever carrying a pointer 134 which cooperates with scale markings 135 on a fixed indicator plate 136. An aperture is formed in the wall of the upper head 93 and this aperture is closed by a transparent disc 137 held in place by a sealing ring 138 so that the scale and its reading can be observed by the operator.

It will further be observed that a major part of the mechanism for rotatably supporting and adjusting the upper band wheel, including all of the working parts of that mechanism, and likewise including the resilient element and the indicating mechanism for indicating the tension in the saw blade, are mounted within the housing formed by flange 100 and cover 101. This mechanism is therefore entirely out of the way of scraps and food particles which might be thrown from the saw blade or upper wheel. Thus such scrap particles do not collect upon any of this mechanism and none of the lubricant from the mechanism can find its way into the recessed part of the head or upon the band wheel itself. The band wheel 105 is readily removable from its support without the use of tools, and when so removed, full and free access is provided to the entire smooth inner surface of the head which can be wiped clean in a simple manner. There are no difficult parts to clean, and the entire upper portion of the mechanism can thus very easily be kept in a clean and sanitary condition.

As shown in Fig. 13 the upper band wheel 105 and the lower band wheel 52 are spaced from each other so that the band saw has a forwardly located downwardly travelling flight 140 and a rearwardly located upwardly travelling flight 142. In order to keep the surface of the upper band wheel clean, a scraper unit 145 is mounted upon the recessed wall 94 of the upper head as shown in Figs. 8 and 13. The construction of such scraper is illustrated in Fig. 15 in which the housing 146 is shown as receiving a plunger 147 to the end of which the scraper blade 148 is secured by means of bolt 149, the scraper having a plurality of contacting surfaces to engage the wheel, and preferably being square in outline. The scraper blade 148 is normally urged into engagement with the wheel by compression spring 150 housed within member 146, a C-shaped clamp 151 carried on the inner end of plunger 147 preventing excessive travel and providing for ready removal thereof. The construction of the scraper unit 145 for the lower band wheel 52 is essentially the same as that just described, as indicated in Fig. 13.

In order to guide, absorb and thrust, and facilitate the cleaning of the blade immediately after it has passed through the work material, a combined blade scraper, blade guard, blade guide, thrust bearing, and wheel scraper unit is provided which can be readily removed from its operative position when desired so that it can be easily cleaned. This assembly (Fig. 13) is preferably formed as a single casting to which there is bolted a slide plate 156 which is received within suitable slide ways 157 formed in a supporting member 158 as shown in Fig. 14. This member in turn is mounted upon the housing of the machine inwardly of the front wall thereof just below the level of the work table and in line with the downward flight 140 of the saw blade. A top projection 159 is formed on the casting which is received over the edge of the plate 156 to engage support 158 and thus serve as a limit stop to control the downward movement and properly locate the casting in operative position.

The casting has a depending portion 160 with a cross arm 161 extending transversely of the blade at one side thereof and providing supports for two upwardly inclined blade wipers 163 as shown in Fig. 13. The blade wipers are of suitable resin impregnated fabric or the like and have a beveled face 164 adapted to bear against and scrape the opposite sides of the blade. They are urged toward the blade by means of torsion springs 165 received over the mounting shafts 166 (see Fig. 17). A projecting arm 170 supports the scraper unit 145 for the lower band wheel 52, as shown in Fig. 13.

As shown in Fig. 14, the casting 155 is formed with a sloping deflector surface 172 located immediately adjacent that one of the blade wipers 163 which is on the inside of the band and closest to the wheel 52. Thus any material removed or scraped from the band is deflected laterally so that it falls downwardly into the scrap drawer and is prevented from falling back onto the band or wheel.

In order to absorb the thrust and provide a guide for the back edge of the saw blade, the casting 155 also is constructed to receive and adjustably mount the ball bearing 174. This bearing is preferably sealed and is mounted on stud 175 with its outer race directly opposite the back edge of the saw blade 140—142 and is secured eccentrically thereon by bolt 176 as shown in Fig. 16, the stud being held in the casting by means of bolt 177.

The periphery of the stud is formed with worm teeth 178 and these teeth are engaged by the threads of a screw 180 having set screw 181 to hold it in proper axial alignment in casting 155, the head 182 of the screw being readily accessible and provided with a slot for the application of a screw driver thereto.

It will thus be apparent that when it becomes necessary to adjust the guide bearing 174 closer to or farther from the edge of the blade, it is not necessary to disassemble any of the mechanism but the adjustment is effected by the direct turning of screw 180, such screw and worm thread combination being self-locking so that it remains in any adjusted position. This greatly facilitates the making of the necessary adjustments.

Casting 155 also supports guides for the saw, the latter being shown in detail in Figs. 18 and 19. As there shown the guides are formed in two parts, a rear fixed element 185 and a forward pivoted element 186. Element 185 is preferably of metal and is provided with a longitudinal slot 187 for receiving the sides of the saw blade and with an enlarged drilled aperture 188 to make it impossible for grease or other food material to collect and bind against the side face of the saw blade. Removal of grease is also facilitated by the provision of beveled offset portions 189 at each side of and adapted to scrape the sides of the blade, removing foreign matter therefrom and causing it to work downwardly toward the end of the guide from which it is readily removed.

The cooperating member 186 is mounted for pivotal movement on shaft 191 which is suitably supported in a bracket 192 (Fig. 14) formed as part of casting 155 making it possible for this portion of the guide to be raised to a clearance position as shown in Fig. 14. Member 186 has its lower edge cut away as shown at 193 to facilitate such pivotal movement, and it also has a longitudinal slot 194 which is wide enough to permit the free travel of the teeth of the saw but is normally out of contact therewith. This member is preferably made of a resin impregnated fabric or other relatively soft material so that if the saw blade should become displaced and travel forwardly, it would not be damaged but would merely cut into the relatively soft material of this guide. It will also be clear that with the two guides 185 and 186 in their normal operative positions, the band can not be removed, it being necessary in order to remove the band to pivotally move guide 186 to its open position, to provide for either removal of the band or the removal of the unitary assembly 155.

Referring further to Figs. 8 and 9, a trough member 200 is preferably provided in the laterally open channel of the pedestal 70, the trough being received inwardly of the outer flange 91. The trough is closed on three sides and open on its fourth side so that it can be merely slipped into place with a lateral movement when cover 96 is open. It is supported by a bracket 202 at its lower end which is received over a part of the base to serve as a support, passing through an opening 203 in the top wall of the base. The rear wall of the trough extends upwardly as shown at 205 to facilitate the delivery of scraps and particles from the blade into the trough.

The trough extends downwardly well below the axis of the lower shaft 41, and terminates with a forwardly projecting wall 206 immediately above the bottom wall 63 of drawer 60. As shown in Fig. 2, therefore, material collected in the trough and discharged therefrom will fall downwardly and be delivered directly into the drawer so that upon removal of the drawer, the scraps and particles of food from the trough will be picked up and in that way discharged. It will be evident that even in the absence of the trough, the food particles will merely be deposited upon the smooth walls of the channel in pedestal 70 from which they will fall or may be swept downwardly to the drawer and thus the entire cleaning operation under any condition of use is greatly facilitated.

Upper guide means are also provided for guiding and supporting the blade in the course of its travel from the overhanging head toward the cutting position. This means is illustrated in Figs. 1 and 8 and in Figs. 20 through 24. The assembly is shown as including a main casting 210 which is secured to the lower end of a supporting rod 212 with a hand knob 213 being provided to facilitate the vertical adjustment thereof. The supporting bar 212 is preferably rectangular in cross section and extends upwardly where it is frictionally received beneath a pressure plate 215 (Fig. 24) urged by spring 216 against the bar, the spring being mounted in a cup formed in a housing member 217 secured to the front edge of the head 93 by screws 218. This provides a vertically adjustable support for the bar, a limiting pin 219 (Fig. 8) being provided at the upper end to limit downward travel thereof. It will be understood that the bar is firmly supported from the head by guiding contact with an accurately formed passageway in housing 217 so that it is free from vibration but may be manually raised or lowered under friction plate 215 by direct pressure applied to knob 213.

The casting 210 provides a support for a protector or guard member 220 which as shown in Fig. 22 has a milled out face 223 which is opposed to and extends closely parallel with the cutting edge of the blade. Guard member 220 extends upwardly through a notch 224 (Fig. 8) formed in peripheral flange 95 of the head, the guard thus traveling through the notch as required with the varying elevation of the entire assembly, but at all points remaining in protective relation with respect to the cutting edge of the blade.

At its lower end guard 220 is formed with a pin 225 which is received within a holder 226, the holder being carried on a shaft 227 which is frictionally held by spring 228 in a recess in casting 210. This provides for the normal retention of the guard in its upright protective position as shown in full lines in Figs. 20 and 21 while permitting movement thereof through the arc to the inclined or dotted line position as shown in Fig. 21 when the closure 96 is open. In the latter position it is spaced from the blade and can be easily cleaned by a single wiping operation with a cleaning cloth, and then returned to its protective guarding position.

Member 226 also carries guide piece 230 of phenolic composition or the like which is slotted as shown at 231 to receive the cutting edge of the blade therein. When the guard 220 is in its normal position the protective part 230 is also in position to protect the edge of the blade so that any tendency for the blade to move forward, under back pressure from the work material or in the event the blade is thrown off of the band wheels, will result merely in the teeth cutting into the relatively soft material of piece 230 but without any damage occurring to the blade or to other parts of the device. When however the part 230 is tilted to its inoperative position, the slot 231 is exposed and may be easily cleaned and similarly restored to its operative position. This tilting and opening of part 230 is also important in providing for removal of the band when necessary.

Casting 210 also provides a support for a stud 235 and is recessed to receive a ball bearing thrust guide 236. Guide 236 is mounted on stud 235 eccentrically as shown in Fig. 23 and secured in place by bolt 237. Stud 235 is secured in place by screw and washer 238. This bearing 236 is adapted to bear against the back edge of the blade to take up the thrust thereon and, together with the corresponding bearing 174 below the work position, to maintain the same in proper working relation. As described in connection with the lower bearing, stud 235 has worm teeth 240 cut on its periphery and these teeth are engaged by a screw 241 which is readily adjusted by means of the cross slot 242 formed in the head of the screw. This forms a self-locking, continuously and readily adjustable arrangement, permitting the adjustment of the roller in relation to the back edge of the blade through the simple use of a screw driver to turn screw 241, the construction providing for locking itself in any adjusted position.

It will be evident from the above that the entire assembly 210 may be removed as a unit for cleaning upon removal of hand screw 213 which releases the assembly from the supporting bar 212.

The saw blade 140—142 is shown in enlaarged detail views in Figs. 25 and 26. As there shown teeth 245 and 246 are formed on the cutting side of the blade, these teeth being spaced from each other as shown at 247. In addition, the cutting face 248 of each of the teeth is inclined rearwardly in the direction of travel of the saw blade, the face 248 having a slight rearward inclination as opposed to being normal to the path of travel or being forwardly inclined as is the common practice. This rearward inclination may be considered as negative or reverse rake, and the angle $a$ as indicated in Fig. 25 may conveniently be of the order of 5°.

In addition alternate teeth 245 and 246 are laterally bent or set in opposite directions as shown in Fig. 26. The amount of such bending will determine the freeness and to some extent the speed of cutting, but an excessive spread results in waste of material and for that reason a proper amount of offset of each tooth from the normal position has usually been found to be of the order of .007 to .012 inch.

A saw constructed in this manner has been found to give very satisfactory results, to cut into meat, bone, or other food material quite rapidly, to have a minimum of waste, and to continue to hold itself properly on the band wheels even under rapid cutting operations.

Refeerring now to Fig. 27, this figure shows a plan view looking down onto the work table 250 and the work supporting carriage 252. The work table has a rear upwardly projecting flange 253 and has an offset flange 254 directly over the opening 203 in the base through which the band saw and the trough 200 extend.

A pair of angles 255 are secured to the under side of the table, the outer one of which engages under lugs 256 (Figs. 2 and 27) bolted to the top wall of the base. Adjacent each lug is a grommet 257 which forms a yieldable support for receiving the lower flange of the forward angle 255 when the latter is engaged beneath lugs 256. Also as shown in Fig. 27, the angles 255 extend lengthwise of the table substantially throughout its entire length providing a reinforced support therefor.

An eccentric locking member 258 having a handle portion 259 is mounted at the rear of the work table through pivot pin 260 to bracket 261, the latter being bolted to the top of the base by means of the same bolts which secure frame 30 in place thereon. Member 258 has an eccentric camming face 262, as shown in Fig. 30 which is adapted to engage over a pin 263 projecting from a block 264 secured to the rear flange 253 of the work table.

As shown in Fig. 31, block 264 has an inclined face while locking member 259 has a correspondingly inclined face, the inclination being such that upon the pivotal movement of the locking member to engage pin 263, a lateral pressure is developed in the direction toward the front side of the work table.

In operation, the work table is moved into position with the forward angle 255 engaged beneath stop lugs 256 and with the flanges of both angles yieldably supported upon the resilient grommets 257. When locking member 259 is then moved to the position shown in Fig. 30, a dual locking action is provided as follows. The work table is urged forwardly to the limiting position determined by the engagement of the forward angle 255 under the stop lugs 256, and simultaneously the work table is drawn downwardly and held forcibly against the resilient grommets. This provides a firm and accurate support for the work table which is accomplished with the movement of a single locking member, greatly facilitating the removal and replacement of the table for cleaning purposes.

At the front side of the base a pair of gusset plates 265 (Fig. 2) are bolted by means of bolts 266 forming an overhanging mounting for receiving angles 267 and lugs 268 on which is supported the plate 269 formed with upper flanges 270 spaced from angles 267 to form a pair of parallel upper and lower tracks for receiving the work carriage.

The work carriage 252 has a rear flange 271 and on its under side carries brackets 272 on which are mounted spaced pairs of rollers 273 adapted to travel in the guide tracks.

It is desirable to restrict the maximum movement of the work carriage while allowing an extent of travel in excess of the longitudinal dimensions thereof to assure completion of each cutting stroke. For this purpose a stop plunger 276 (Fig. 28) is mounted upon a pin 277 which is yieldably urged upwardly through plate 269 by means of compression spring 278. A hand knob 279 exposed below and centrally of plate 269 forms a convenient means for withdrawing the plunger when removal of the carriage is desired. The upper face of the plunger is milled out as shown in Fig. 29 to provide abutment faces 280 and 281 which are laterally offset from each other as shown.

Cooperating with the abutment faces are spaced angles or stops 284 and 285 which are located adjacent opposite ends of the work carriage respectively. Further as will be evident from Fig. 27, bracket 284 is in alignment with abutment face 280 while bracket 285 is in alignment with abutment face 281.

In operation the carriage may be reciprocated through a normal stroke of movement on a forward or cutting stroke and a backward or return stroke, the work being pushed laterally against the gage plate 300 at the beginning of each cutting stroke. The extent of forward travel on the cutting stroke is determined by the engagement of bracket 285 with abutment 281 while the extent of return movement is limited by engagement of bracket 284 with abutment 280. It will be noted that this provides for a slight overtravel of the carriage so that it can normally travel a distance somewhat greater than its longitudinal extent. When however it is desired to remove the carriage it is only necessary to pull downwardly on knob 279 thereby withdrawing both abutments from the path of the stops, and allowing the carriage to be removed beyond the end of the tracks by a continuation of its regular travel in either direction.

One of the gusset plates 265 provides a convenient mounting for a control handle 290 (Figs. 2 and 32) which is in the form of a lever having a link connection 291 with an operating bar 292 which selectively actuates one or the other of two switch actuating plungers 293 for selectively closing or opening the switch 294 which controls the operation of motor 45. The switch mechanism is thus located in the right hand housing 26 where it is enclosed and out of the way of scraps from the band saw and lower band wheel.

A gage plate 300 is provided having a working face 301 secured thereto by bolts 302 (Fig. 33) against which the work material may be pressed while being carried forwardly on the carriage into cutting relation with the saw. The end of the gage plate which overhangs the table carries a runner 303 which rides over the upper surface of the work table to support the gage plate in proper parallel relation thereabove. Scale markings 305 (Fig. 27) on the upper surface of the table provide a direct reading indication of the thickness of cut for which the gage plate is set.

The gage plate is mounted for adjusting movement upon a rack bar 310 which is held in the arms 311 on a bracket 312 which is secured to the side of the base by suitable attaching means. The rack bar has rack teeth 314 which are cut on only one face thereof, so that they extend over only about a quarter of the periphery of the bar.

The gage plate is formed with a downward projection 316 as shown in Fig. 33, which houses a lever 318 pivotally supported in the gage plate at 319. The lever has supporting arms 320 in which a worm shaft 321 is mounted, the worm shaft extending through an elongated slot 322 in the wall of the housing and having a hand wheel 323 secured to the outer end thereof.

The worm 321 is in continuous engagement with worm wheel 325 which is mounted upon a vertically extending shaft 326 to the lower end of which is secured pinion 327 which is adapted to engage the rack teeth 314 of the rack bar. Normally the pinion 327 is held in engagement with the rack teeth through the action of tension spring 328 urging a clockwise movement of the lever (Fig. 33) which acts in the proper direction to maintain this relationship. The spring however permits the lever 318 to be rocked about its pivot in response to an upward or bodily shifting movement of hand wheel 323 which results in the pivoting of the entire lever and pinion structure, withdrawing the teeth of pinion 327 from engagement with the rack teeth 314.

In operation, if a slow or accurate setting of the gage plate is desired, this is accomplished by the rotation of hand wheel 323 to move the gage plate in either direction to establish the proper spacing and thickness of cut as shown by the scale. Where however a rapid change of setting is desired, this may be readily accomplished by merely lifting upward on handle 323, freeing the pinion 327 from the rack teeth and allowing the gage plate to be rapidly moved across the work table to any desired position with complete freedom. Upon release of handle 323 the normal engagement is reestablished and the gage plate is then held and locked in predetermined set position.

It is also important to provide for the proper movement of the gage plate so that it will travel properly across the table to allow full use of the table surface, but will not interfere with the end flange 254, the band saw, or any other parts of the structure. For this purpose the lower end of housing 316 is provided with a right angle shaped lug 330 and the initial or outer portion of the bracket 312 is provided with a right angular groove 331 as shown in Figs. 34 and 35. It will be evident from these views that while the gage plate is traveling through this portion of its range of travel it cannot be either raised or lowered, but is maintained in the substantially normal parallel relation to the top of the work table.

This condition is maintained up to a position slightly ahead of the position of maximum thickness for which an indication is afforded on the top of the work table, corresponding approximately to the position where the end of the gage plate housing would strike the rim portion 254 of the work table 250. In this latter position the bracket 312 is formed with an arcuate slot 333, which is shown in Fig. 36 and allows complete freedom of swinging movement so that with the gage plate in this latter position it can be swung free from its normal operative position to the upper raised position illustrated. Beyond the slot 333 the bracket has a forwardly projecting wall 335 which has an end face 336 against which the lug 330 will engage if it is attempted to move the gage plate rearwardly beyond its position of maximum thickness while occupying its normal relation parallel to the table top. This protects the gage plate so that it cannot be forced backwardly against the end flange 254 or the pedestal portion of the head. It can however be lifted to the raised position illustrated in Fig. 37, at which time it is clear of the end flange 254 and of the pedestal, after which it can be moved laterally to an extreme position where it is entirely removed from the table, thus making possible the handling of work material of maximum size, unrestricted by any limitations of the gage plate and limited only by the extent of the throat opening between the downward flight of the saw band and the front face of the pedestal. In this latter range of positions the gauge plate cannot be lowered but must be kept in the raised position shown in Fig. 37.

It is sometimes found that the work material has a tendency to rub against the saw blade upon the return travel of the work carriage. Under these conditions and with the work material remaining in its cutting position upon the carriage the vertical surface of the work material from which the slice has been cut is in rubbing contact with the saw blade on the return stroke. With certain types of work material which is relatively soft or yieldable, such as certain types of meat and the like, there is a tendency for the unsupported face of the work material to bulge outwardly, and this may result in a further tendency toward rubbing contact with the saw blade, or in applying a backward thrust to the blade having a tendency to dislodge it from its normal path of travel.

This condition may be overcome according to the present invention which provides a mechanism for effecting a lateral shift in the position of the work material on the return stroke thereof so that it is moved in the direction laterally away from the blade during the return movement and then restored to its original relation with respect to the saw and gage plate upon the subsequent forward or cutting stroke.

Referring to Figs. 38 to 44 in which such an arrangement is shown, stationary track members are shown at 350 with a fixed plate 351 extending therebetween, such plate providing for supporting the limit and release plunger 352 thereon, similar in construction and mode of operation with plunger 276. A plate 355 is mounted upon rollers 356 which travel in tracks 350, such plate having a simple reciprocatory movement without lateral shift.

Plate 355 supports oppositely extending brackets 357 on which are mounted rollers 358 the upper surfaces of which form a support for receiving the actual work carriage 360. As shown in Figs. 39 and 40 carriage 360 is thus mounted upon plate 355 for lateral shifting movement and is movable with plate 355 for longitudinal reciprocating movement past the saw blade the position of which is indicated at 361.

In order properly to guide and limit the travel of the shifting movement of carriage 360 a bar 363 is secured to the under side thereof, the bar having a T-shaped head 364 thereon engageable with the outer edge of plate 355 in the inner or cutting position of the carriage as illustrated in Fig. 40.

The guide bar 363 passes between two pairs of rollers 366 which are spaced from each other sufficiently to receive the bar 363 therebetween in close guiding relation. Rollers 366 are mounted on the upper ends of shafts 367 secured in upstanding relation on plate 355 as shown in Fig. 41.

In order to prevent removal of the work carriage except when in proper position, a pair of brackets 370 are secured to the under side of the work carriage the brackets having arms 371 which are engageable under one pair of rollers 366. While such engagement continues it will thus be clear that the work carriage 360 is locked to the plate 355 and while it may move or shift laterally relative thereto, it cannot be removed until it has been withdrawn to the dotted line position illustrated in Fig. 39 at which point the flanges 371 have cleared rollers 366, whereupon the carriage may be directly lifted away from the plate 355, and removed for cleaning and the like.

In order to effect the shifting movement of the carriage away from the saw blade 361, carriage 360 is provided with a downwardly extending pin 375 which is adapted to be engaged by lever 376 pivoted at 377 to the top of plate 355. Spring 378 engages the opposite end of the lever, the spring being adjustable as to its tension as shown at 379 to provide for applying a predetermined shifting force to the carriage. A stop 380 is secured to the plate 355 to limit the maximum travel of lever 376 under the spring action.

The operation of this system is as follows. During a cutting stroke and with the work material positioned upon the top of carriage 360, the operator manually presses laterally against carriage 360, moving pin 375 inwardly against lever 376 and overcoming the action of tension spring 378. This inward movement is limited by the T head 364 to the position shown in Fig. 40 where the carriage occupies its normal relation to the saw blade.

While this lateral pressure is continued, a longitudinal pressure is then exerted and the entire carriage and plate assembly travels longitudinally to the left as viewed in Figs. 39 and 40, thereby carrying the work material past the saw blade for the making of a cut. At the end of the cutting stroke the lateral pressure on the carriage is released and the spring 378 immediately presses pin 375 and through that the work carriage 360 to the lateral or shifted position as shown in Fig. 39, resulting in the movement of lateral shifting of the work material away from the saw blade. The carriage can then be returned with its longitudinal movement to the beginning of its stroke where it is again ready to be pressed to its operative position, the work material in addition being manually moved across the carriage to the position determined by the setting of the gage plate. It is found that this action can be readily accomplished by the operator, the lateral shifting movement being easily effected by contact of the body with the side of the work carriage, while the longitudinal reciprocating movement is accomplished both by hand and body motion.

It is also found desirable to provide for disabling this shifting mechanism for certain types of work material where its use is not required and for this purpose an eccentric cam member 390 is provided which is pivotally mounted as shown at 391 to the upper face of plate 355. The cam has an operating handle 392 and a notched out portion 393. It is arranged to cooperate with a rectangular shaped bar 394 which extends downwardly from the lower side of the work carriage 360.

The several positions of the cam are illustrated schematically in Figs. 42 to 44. When it is desired to remove the work carriage, as for cleaning and the like, the cam is turned to bring its notch 393 opposite the bar 394, thereby allowing the bar to travel into the notch, and providing for the lateral shifting of the carriage to the release position illustrated in dotted lines in Fig. 39. As above described, in this position the whole carriage can be directly removed from its roller supports 358 and cleaned, and is easily restored without requiring connection or disconnection of any additional mechanism.

When the use of the shifting mechanism is desired, the cam 390 is adjusted to the position shown in Fig. 43 in which the lateral shifting movement is limited by the engagement of bar 394 with the low portion of the cam. This is the condition illustrated in full lines in Fig. 39 in which the work carriage is spaced from the normal working plane but retained in locked position and cannot be removed. With the cam in this position the operation of the shifting mechanism takes place as described more fully above.

When it is desired to operate without the shifting mechanism the cam is turned to the position shown in Fig. 44 where the high point 395 of the cam is brought into engagement with the bar 394, resulting in the permanent retention of the carriage in its normal position and preventing any shifting movement thereof. Thus with the cam in this position the shifting mechanism is ineffective, and the carriage functions as a normal carriage and in the absence of any lateral shift.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A meat saw of the character described comprising a base, a lower band wheel in said base, a pedestal supported in said base, said pedestal having a relatively narrow column and an upper overhanging head portion supported thereon, an upper band wheel rotatably mounted in said head portion, a band saw encircling said band wheels and having one flight exposed for cutting purposes and the other flight extending through and enclosed by said column, a trough member in said column for enclosing said other flight of said band saw for collecting material therefrom, and means for removably mounting said trough member in said column for cleaning purposes.

2. A meat saw comprising a base, a housing for enclosing said base, an upper head member, means in said housing supporting said head member for vertical adjustment with respect to said base, means forming a closed compartment substantially centrally within said housing leaving a space within said housing at either side of said compartment, a lower band wheel within said compartment, means within one of said spaces in said housing for supporting and driving said lower band wheel, an upper band wheel mounted in said head member, a saw band including said wheels, means located in the other of the said spaces in said housing for adjusting said head to tension said saw band, said compartment extending in closed and continuing relation to the walls of said housing to protect said supporting and driving means and said adjusting means against access of material thrown from said lower band wheel and saw band, and separate means providing access to each of said spaces and to said compartment independently of each other.

3. A meat saw of the character described comprising a base including an enclosing casing having front and side walls, partition walls fixed within said casing and forming a relatively deep and narrow compartment extending from front to back within said casing, said partition walls being located in spaced relation with one of said side walls to define therewith a space within said casing separate from said compartment, a lower band wheel in said compartment adapted to receive a saw band thereon and having the axis thereof arranged transversely of said compartment, means in said space including a shaft extending through one of said partition walls for supporting and driving said band wheel, said partition walls continuing in substantially unbroken relation to said front wall of said casing to prevent communication between said compartment and said space and to prevent transfer of foreign material between said supporting and driving means and said band wheel and saw band, means forming a relatively narrow opening in said front wall of lesser width than the diameter of said band wheel providing direct access to said compartment and said band wheel independently of said space and of sufficient height for passage of said wheel edgewise therethrough, a drawer receivable in said compartment through said access opening to underlie said band wheel, said drawer being relatively deep, long and narrow to extend into said compartment beneath said wheel for receiving material dropping from said wheel and saw band and being removable endwise in the direction of its length through said opening for emptying, and means including a closure in one of said side walls separate from said drawer providing access to said space and to said supporting and driving means from outside said casing independently of said drawer and said compartment.

4. A meat saw as defined in claim 3 in which the drawer has a front wall forming a closure for the access opening to said compartment and has a shallow rear wall and relatively higher side walls cooperating with said front wall to enclose the forward portion of said band wheel for receiving material thrown off by centrifugal force by said wheel and the downward flight of said saw band.

5. A meat saw as defined in claim 3 in which the drawer has a front wall forming a closure for the access opening to said compartment, and in which the drawer and one of the partition walls have cooperating means thereon for preventing accidental contact between the drawer and the band wheel during withdrawal and replacement of the drawer, said cooperating means including portions interfitting to form a releasable lock for said drawer in the closed position of said drawer requiring upward movement of said drawer for release and withdrawal thereof.

6. A meat saw as defined in claim 3 having a scraper unit for the lower band wheel including a supporting bracket, relatively high walls on the sides of said drawer, a scraper having a plurality of wheel scraping surfaces, means removably mounting said scraper on said bracket for selective movement of each of said scraping surfaces into scraping relation with said wheel, fixed guide means located in the upper part of said compartment, a slide member on said bracket receivable in said guide means from above to support said bracket with said scraper in engagement with said band wheel to remove scraps from said wheel and discharge the same into the space between said high side walls of said drawer for removal from said compartment, said compartment having an opening in the upper side thereof, a work table on said casing forming a cover for said compartment, and means removably securing said work table on said casing for ready removal providing access to said compartment for removal and replacement of said scraper unit.

7. A meat saw as defined in claim 3 having a wiping and guiding assembly for the saw band removable and replaceable as a unit in said compartment and including a supporting bracket having means thereon for wiping and guiding said saw band on the downward flight thereof, fixed guide means located in the upper part of said compartment, said drawer having relatively high side walls, a slide member on said bracket receivable in said guide means from above to support said bracket within said compartment with said wiping and guiding means located above said drawer to discharge material wiped from said band into the space between said high side walls of said drawer for removal from said compartment, said compartment having an opening in the upper side thereof, a work table above said casing and forming a cover for said compartment, and means removably securing said work table on said casing for ready removal providing access to said compartment for removal and replacement of said wiping and guiding assembly.

8. A meat saw as defined in claim 3 having fixed guide means in the upper part of said compartment, relatively high walls on the sides of said drawer, a bracket including a slide portion receivable in said guide means from above to support said bracket within said compartment, means on said bracket for wiping and guiding said saw band on the downwardly travelling flight thereof including a thrust bearing for engaging the back edge of said saw band, a scraper carried by said bracket in scraping engagement with said band wheel to remove scraps therefrom and discharge the same into said drawer within the side walls thereof for removal from said compartment, said compartment having an opening in the upper side thereof, a work table on said casing forming a cover for the top of said compartment, and means removably securing said work table on said casing for ready removal to provide access to said compartment for removal and replacement of said bracket with said scraper and said wiping and guiding means carried thereby as a unit.

9. A meat saw as defined in claim 3 wherein the outer end of the shaft has a circumferential groove thereon, and a latch member is mounted on the band wheel for movement transversely of said shaft into and out of engagement within said groove to provide for rapid removal of said wheel without requiring the use of tools.

10. A meat saw as defined in claim 3 having legs for supporting said base and casing in spaced relation above the floor, each said leg including an independently adjustable floor engaging lower portion providing for leveling said meat saw, sealing collars adjustably received on said legs and adapted to be moved into sealing engagement with said floor outwardly of said adjustable leg portions to prevent access of foreign matter beneath said legs, said casing including a bottom wall closing said space therewithin to prevent escape of foreign matter therefrom onto said legs from above, and said compartment including a bottom wall extending in unbroken relation to said front wall of said casing preventing escape of foreign matter from said compartment onto said legs from above even when said drawer is removed from said compartment.

DAVID A. MEEKER.
GERALD B. FOX.
BURTON E. SULLENBERGER.

(References on following page)

REFERENCES CITED

The following references are of record in the file of this patent:

UNITED STATES PATENTS

| Number | Name | Date |
|---|---|---|
| 229,772 | Suisse | July 6, 1880 |
| 250,078 | Kimball | Nov. 29, 1881 |
| 384,252 | Gillis | June 12, 1888 |
| 478,148 | Wentz | July 5, 1892 |
| 532,471 | Mershon | Jan. 15, 1895 |
| 848,842 | McKam | Apr. 2, 1907 |
| 867,081 | Robinson | Sept. 24, 1907 |
| 1,054,288 | Fleming | Feb. 25, 1913 |
| 1,230,275 | Carlson | June 19, 1917 |
| 1,258,517 | Woods et al. | Mar. 5, 1918 |
| 1,270,285 | Good | June 25, 1918 |
| 1,362,319 | Jakobb | Dec. 14, 1920 |
| 1,427,661 | Walker | Aug. 29, 1922 |
| 1,511,788 | Vaughan | Oct. 14, 1924 |
| 1,552,665 | Authenrieth | Sept. 8, 1925 |
| 1,643,829 | Biro | Sept. 27, 1927 |
| 1,793,461 | Biro | Feb. 24, 1931 |
| 1,848,300 | Avilla | Mar. 8, 1932 |
| 1,870,774 | Gaines | Aug. 9, 1932 |
| 1,872,656 | Bleam | Aug. 23, 1932 |
| 1,938,548 | Tautz | Dec. 5, 1933 |
| 1,975,032 | Winfree | Sept. 25, 1934 |
| 2,059,595 | McKeage | Nov. 3, 1936 |
| 2,081,033 | Biro | May 18, 1937 |
| 2,104,360 | Biro | Jan. 4, 1938 |
| 2,120,963 | Biro | June 21, 1938 |
| 2,141,504 | Balfour et al. | Dec. 27, 1938 |
| 2,305,177 | Litty | Dec. 15, 1942 |
| 2,311,762 | Kottmann et al. | Feb. 23, 1943 |
| 2,347,765 | Boice et al. | May 2, 1944 |
| 2,380,700 | Lasar | July 31, 1945 |
| 2,492,824 | Ahrndt et al. | Dec. 27, 1949 |

FOREIGN PATENTS

| Number | Country | Date |
|---|---|---|
| 608,767 | Great Britain | of 1948 |